United States Patent [19]

Jiewertz

[11] Patent Number: 4,862,093

[45] Date of Patent: Aug. 29, 1989

[54] METHOD AND AN ARRANGEMENT FOR THE DETECTION OF IONIZING CURRENT IN THE IGNITION SYSTEM OF AN INTERNAL COMBUSTION ENGINE INCLUDING ENGINE START SEQUENCE DETECTION

[75] Inventor: Sten Jiewertz, Järna, Sweden

[73] Assignee: Saab-Scania AB, Sweden

[21] Appl. No.: 236,664

[22] Filed: Aug. 25, 1988

[30] Foreign Application Priority Data

Aug. 27, 1987 [SE] Sweden ................................ 8703320

[51] Int. Cl.⁴ ........................ G01N 27/62; F02P 17/00

[52] U.S. Cl. .................................... 324/464; 324/460; 324/380; 123/425

[58] Field of Search ............... 324/380, 378, 459, 460, 324/464, 468, 391, 392; 123/425, 536; 364/424.03, 424.04; 73/116; 361/29

[56] References Cited

U.S. PATENT DOCUMENTS

| | | | |
|---|---|---|---|
| 4,291,383 | 9/1981 | Tedeschi et al. | 324/384 X |
| 4,359,893 | 11/1982 | Kizler et al. | 324/460 X |
| 4,491,110 | 1/1985 | Bone et al. | 123/425 |
| 4,515,132 | 5/1985 | Anderson et al. | 324/460 X |
| 4,601,193 | 7/1986 | Reinhold Blauhut | 73/35 |
| 4,648,367 | 3/1987 | Gillbrand et al. | 123/425 |

*Primary Examiner*—Reinhard J. Eisenzopf
*Assistant Examiner*—Jack B. Harvey
*Attorney, Agent, or Firm*—Ostrolenk, Faber, Gerb & Soffen

[57] ABSTRACT

The invention relates to a method and an arrangement for detecting ionizing current in an ignition circuit incorporated in the ignition system of an internal combustion engine, in which a measuring voltage is applied to the ignition circuit in at least one secondary winding, and in which a measuring device is used to detect the possible presence of an ionizing current in the ignition circuit. A low measuring voltage is applied during an engine start sequence, or alternatively, no measuring voltage at all, and a high measuring voltage is applied subsequent to the engine start. The invention thereby overcomes the problem existing when measuring ionizing currents of the spark plugs becoming coated with soot deposits as a result of the electrical voltage field which always exists between the electrodes of respective plugs. Such problem is particularly troublesome during an engine start sequence, since the deposits can prevent the engine from starting.

7 Claims, 1 Drawing Sheet

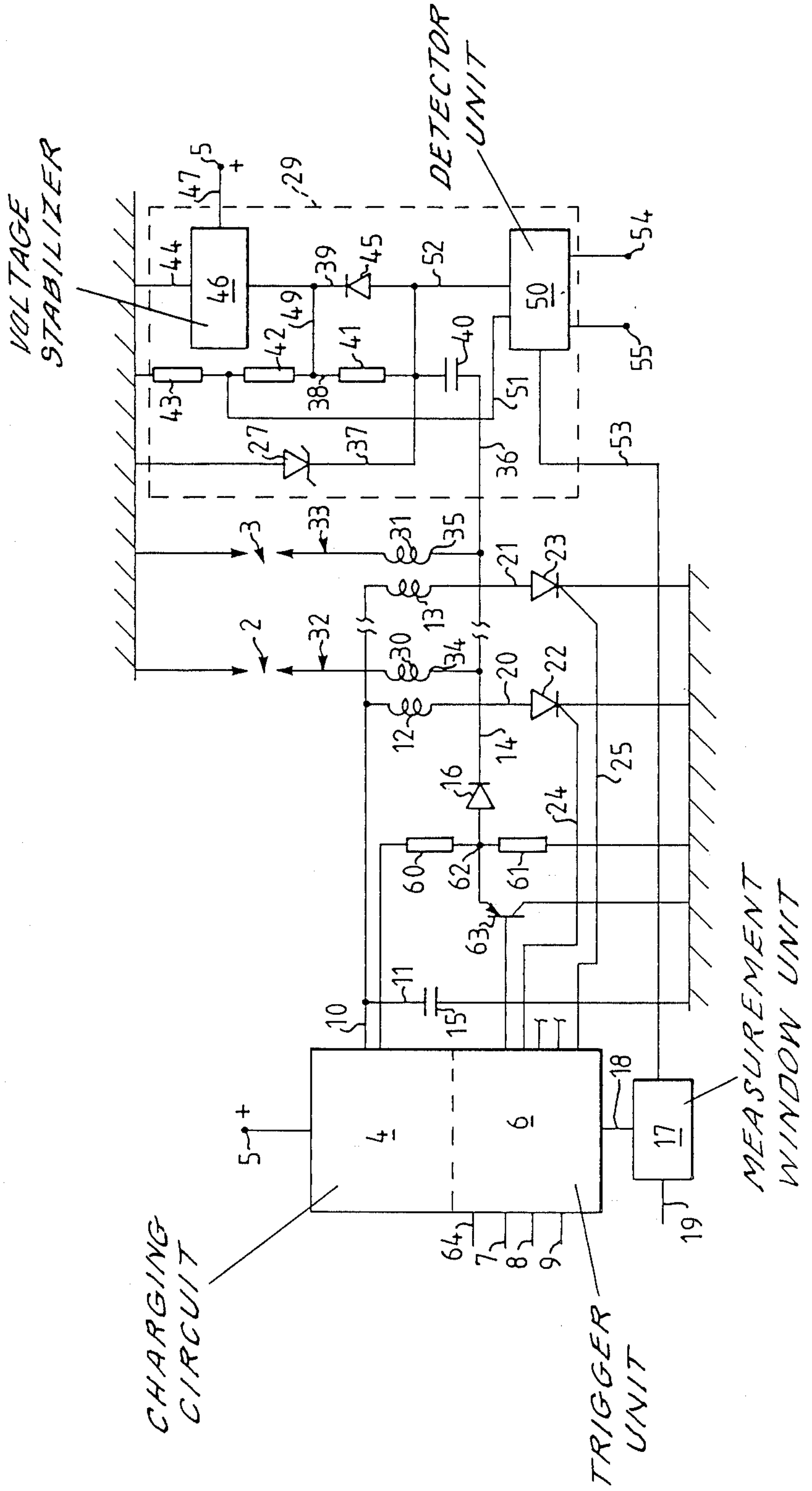
VOLTAGE STABILIZER
DETECTOR UNIT
CHARGING CIRCUIT
TRIGGER UNIT
MEASUREMENT WINDOW UNIT

METHOD AND AN ARRANGEMENT FOR THE DETECTION OF IONIZING CURRENT IN THE IGNITION SYSTEM OF AN INTERNAL COMBUSTION ENGINE INCLUDING ENGINE START SEQUENCE DETECTION

BACKGROUND AND SUMMARY OF THE INVENTION

The present invention relates to a method and an arrangement for detecting the presence of an ionizing current in an ignition circuit incorporated in the ignition system of an internal combustion engine, in which a measuring voltage is applied to at least a secondary winding in the ignition circuit, and in which a measuring device is used to detect the possible presence of ionizing current in the ignition circuit.

Such a method and arrangement are described in Swedish Patent Specification SE No. 442 345. This specification describes the use of an essentially constant measuring voltage for detecting or establishing the presence of ionizing current, for the purpose of detecting abnormal combustion and/or of establishing in which cylinder combustion has actually taken place. In order to establish positively that combustion is abnormal, e.g. to establish knocking, the measuring voltage applied to the electrodes of the spark plugs is preferably relatively high, e.g. in the order of 400 volts. When using capacitive ignition systems, the ignition voltage is normally stepped up in two stages, a voltage of the foregoing magnitude being obtained in an intermediate stage.

Thus, in known ignition systems of this kind it is very easy to obtain the measuring voltage required to detect the ionizing current.

The use of a relatively high measuring voltage, however, has disadvantages. Tests have shown that the spark plugs quickly become coated with soot particles which are liable to prevent the engine from starting, particularly in the course of starting an engine, and especially when the engine is cold.

When the sole purpose of measuring ionizing current is to establish whether or not combustion has actually taken place, it is possible to use a lower measuring voltage, in the order of 60–100 volts. However, although this lower voltage will reduce the extent to which carbon deposits are formed on the spark plugs and therewith alleviate the problems of ignition, the application of a lower voltage is itself accompanied by certain drawbacks. When detection of the possible presence of an ionizing current is effected in order to establish whether combustion is abnormal or not, preferably to detect the occurrence of knocking and premature ignition, it is safest to utilize a high measuring voltage, with which the foregoing drawbacks cannot be avoided.

The reason why spark plugs become sooted up in this fashion is because the soot, or carbon, particles are charged electrically and consequently are attracted to the electric poles constituted by the spark plug electrodes in an ionizing current measuring process. The same physical properties are utilized purposely in so-called electrostatic filters, in which a voltage field generated between two poles is utilized to filter out solids present in such field.

Soot particles present in the combustion chamber consist essentially of non-combusted fuel. Normally, when starting an engine, an excess of fuel is supplied to the engine in order to facilitate the start. This means that the number of soot particles produced will also increase, thereby aggravating the problem of measuring ionizing current.

The object of the present invention is to avoid this drawback while, nevertheless, ensuring that the ionizing current is measured reliably.

This object is achieved with the inventive method in which a parameter representing an engine start sequence is detected. When an engine start sequence is detected, one of a first substantially constant measuring voltage or no measuring voltage is applied to an ignition circuit in at least one secondary winding. Responsive to such measuring voltage, a measuring device is used to detect the possible presence of ionizing current in the ignition circuit. When detection of the engine start sequence is terminated, a second, substantially constant measuring voltage is applied. The first measuring voltage is lower than the second measuring voltage.

The invention also relates to an arrangement for carrying out the inventive method. In the arrangement there is connected to a connection of an ignition circuit and an external voltage source a connection to earth which includes a semiconductor switch. Such switch receives control signals from a control unit connected to transducers for sensing at least one engine parameter used for detecting an engine start. The control unit is configured to send a signal to turn on the semiconductor switch for closing the earth connection during an engine start; accordingly, the measuring device will apply a lower voltage than that applied in the absence of an engine start.

Thus, the use of a very low measuring voltage, or the total omission of a measuring voltage, during an engine start will avoid or at least greatly alleviate the above-mentioned problem. Although it is not possible to detect reliably the possible presence or occurrence of an ionizing current with the aid of a low measuring voltage, which in itself create drawbacks, this problem can be readily overcome, as will become apparent from the following description.

In a computer-controlled ignition system which lacks a mechanical high voltage distributor, it is possible to utilize an established normal combustion process as a starting point for triggering the supply of ignition voltage to respective cylinders in a given sequence for continued operation or running of the engine. This obviates the need to identify respective cylinders with the aid of cam shaft sensors, as in the case of conventional solutions. In order to remove the drawback created by the invention, it is necessary in the case of a computer controlled ignition system to initiate ignition each time a cylinder is located in its top dead-centre-position during an engine start. In the case of a four-stroke engine this means that, when starting, the engine ignition is initiated twice during a combustion cycle instead of once. A computer controlled ignition system solely requires a modified program having no need for additional components. The resulting increase in wear on the spark plugs can also be overlooked in the present context, since an engine starting sequence is normally of very short duration.

It is not possible when practising the invention to detect that combustion is not normal, e.g. that knocking has developed. However, abnormal combustion only occurs when the engine is hot and/or is heavily loaded. Since such operating conditions do not ococur during a normal engine starting process, the fact that abnormal combustion cannot be detected by means of the inventive method or arrangement constitutes no disadvantage.

When an engine has been started and has run for some time so as to become hot, the sparks which occur normally across the spark plug electrodes will continuously burn off any soot or carbon deposits that may form. It is therefore possible to increase the measuring voltage to a higher level of which the presence of ionizing currents can be detected in a known manner.

The invention thus enables the advantages afforded by an ionizing current measuring process while eliminating the drawbacks which such measuring processes create during an engine start.

BRIEF DESCRIPTION OF THE DRAWING

Further characteristic features of the invention will be apparent from the following claims and also from the following description of an exemplifying embodiment of the invention made with reference to the accompanying drawings, in which the solitary figure illustrates schematically a capacitive ignition system which is provided with an inventive arrangement for the detection of an ionizing current.

DESCRIPTION OF THE PREFERRED EMBODIMENT

The ignition system illustrated principally in the figure is a capacitive type system used in conjunction with multicylinder Otto-cycle engines, although only two of the spark plugs 2, 3 serving respective cylinders are shown on the drawing. Thus, the ignition circuit includes a charging circuit 4, to which voltage is supplied from a low voltage source 5, e.g. a 12 V battery. The voltage on the circuit 4 is transformed to a high voltage of about 400 V. This high voltage is then applied to a line 10 which is connected to a line 11 which incorporates an earthed charging capacitor 15. This capacitor, which is thus charged to a voltage of about 400 V, is connected through the line 10 with parallel-coupled primary windings 12, 13 of a number of ignition coils corresponding to the number of cylinders in the engine. Each primary winding 12, 13 is connected in respective lines 20, 21, which are earthed through a respective thyristor 22 and 23. The thyristors 22, 23 are capable of opening the earthing connection 20, 21 of respective primary windings 12, 13, via signals on lines 24, 25 extending from an ignition pulse triggering unit 6 - hereinafter called the trigger unit. The trigger unit 6 produces output signals in response to input signals appearing on lines 7, 8, 9, 64. These input signals relate to engine speed, engine load, the angular position of the crankshaft, and engine temperature, and are processed in a microcomputer-based system incorporated in the unit 6. When the earth connection of the primary windings 12, 13 opens upon receipt of a trigger signal from the thyristor 22 or the thyristor 23, the capacitor 15 is discharged to earth through the line 20 or the line 21. Consequently, the primary winding concerned will induce a high ignition voltage (about 40 kV) in a corresponding secondary winding 30 or 31. Each secondary winding forms part of a respective ignition circuit 32 or 33 which delivers ignition voltage to the spark plug 2 or 3, for ignition of the fuel-air mixture supplied to the combustion chamber concerned.

One, negative end of respective secondary windings 30, 31 is connected with the central electrode of respective plugs 2, 3, this electrode thus receiving a first negative ignition pulse so as to generate a spark between said electrode and the earthed electrode body of the spark plug. The other, positive end 34 and 35 of respective secondary windings 30, 31 is earthed through a line 36 and a measuring device 29 incorporated therein. This measuring device includes, inter alia, a measuring capacitor 40 which is connected in series with three parallel-coupled lines 37, 38, 39, each of which consolidates the earth connection and which also co-act with a detector unit 50 included in the measuring device 29.

The voltage produced in the charging circuit 4 is utilized to charge the charging capacitor 15. The same voltage is utilized in a voltage divider comprising two resistors 60, 61 which are connected in series between the charging circuit 4 and earth. The resistances of the resistors 60, 61 are selected so that a constant voltage of about 70 V is obtained at a connection point 62 therebetween. The connecting point 62 is connected to the line 36 through which voltage is applied to the measuring capacity 40, via a line 14 which includes a diode 16. The connection point 62 is also connected to earth via a transistor 63, whose base is connected to the trigger unit 6.

Of the lines 37, 38, 39 leading to earth and connected to the capacitor 40, the line 37 incorporates a Schottky-diode 27 whose cathode is connected to the capacitor 40 and the anode connected to earth. The line 38 includes three seriesconnected resistors 41, 42, 43, of which the last mentioned is connected directly to earth. The line 39 includes a diode 45, the cathode of which is connected to a voltage stabilizer 46 which functions as a low voltage source and which is connected to earth over a line 44. The stabilizer 46 also has a connection 47 to the low voltage source 5, which also serves the charging circuit 4.

Connected between the resistors 41, 42 is a line 49 which also connects with the voltage stabilizer 46, there being effected between the resistors 42, 43 a transfer of voltage to the detector unit 50, over a line 51. The line 51 carries a reference voltage to the detector unit 50, whereas a line 52 carries to the detector unit 50 the voltage present between the capacitor 40 and the resistor 41, this value being the true voltage value. A comparison between the reference value on the line 51 and the true or real value on the line 52 is made in a comparator (not shown) included in the detector unit 50.

The detector unit 50 is also supplied with a signal on a line 53 extending from a measurement window unit 17. This unit receives from the trigger unit 6 on a line 18 an input signal relating to the time for triggering the ignition pulse, and on line 19 an input signal which relates to he prevailing angular position of the crankshaft. The output signals of the unit 17 on the line 53 represent the angular ranges of the crankshaft, so-called measurement windows, over which the detector unit 50 shall operate in order to establish whether ionizing current flows in the ignition circuit 32 and 33 respectively or not. Thus, the detector unit 50 produces on lines 54, 55 output signals which represent either the detection or non-detection of ionizing current in different windows.

The described arrangement operates in the following manner. A start sequence is commenced by applying a voltage to the system, via a manually actuable ignition lock, not shown. Subsequently the trigger unit 6 receives signals on the lines 7, 9, 64, these signals being delivered to a comparator included in the trigger unit 6, for comparison with fixed reference values. Thus, an engine speed value which is beneath a given, pre-determined speed value can be utilized to establish the occurrence of an engine start sequence.

This pre-determined engine speed may, advantageously, be of the same value as the engine idling speed, although it must, at the same time, exceed the speed at which the engine can be rotated by the engine starting motor. In the caes of a four-cylinder engine for saloon cars, this pre-determined speed may be about 850 rpm.

Alternatively, an engine start sequence can be considered to have been initiated when the engine temperature is beneath a given pre-determined temperature, such that the engine temperature can be utilized, in an analogous fashion, to detect the occurrence of an engine start sequence, with the aid of the signal on the line 64. In the case of further, alternative embodiments an engine start sequence can be detected with the aid of a signal produced during operation of a starting motor and/or after a given length of time has elapsed from a pre-determined happening, for example that a starting sequence is considered to prevail over a given length of time from the moment of applying voltage to the ignition system.

During an engine start sequence, the trigger unit 6 supplies ignition initiating trigger signals to the ignition circuit 32, 33 in response to signals obtained on the line 9 from the crankshaft sensor. In this case, the trigger signals are sent each time a piston is located in a top-dead-centre position. In the case of a four-stroke engine this means that ignition is also initiated during the exhaust phase of respective cylinders.

During a start sequence, the trigger unit 6 supplies a positive control voltage to the transistor 63, which thereupon connects the point 62 to earth. Consequently, no voltage is applied across the measuring capacitor 40 in the illustrated exemplifying arrangement and it is not therefore possible to measure ionizing current.

In the case of an alternative embodiment, it is possible to apply a low measuring voltage. Because no measuring voltage, or only a low measuring voltage is applied, no soot deposits will form on the spark plugs, as distinct from the case when a high measuring voltage is applied across the spark plug electrodoes. When the engine has started, the trigger unit 6 indicates termination of the engine start sequence, by interrupting the control current to the transistor 63, which thereupon breaks the direct earth connection of the point 62. Instead, the point 62 obtains a voltage which is determined by the voltage divider 60, 61, this voltage according to the foregoing being about 70 V. This voltage is applied to the measuring capacitor 40, enabling the capacitor to be utilized to detect ionizing current. The voltage of 70 V is sufficient to reliably identify normal combustion. If it is also desired to identify abnormal combustion, or alternatively to identify solely abnormal combustion, the reliability in identification can be enhanced by selecting other values for the resistors 60, 61 of the voltage divider, so that a higher measuring voltage, e.g. of 200–400 volts, is applied to the measuring capacitor 40.

The measuring capacitor 40 is charged when voltage is applied thereto. In this case, current flows from the low voltage source 5 to one plate of the measuring capacitor 40, via the charging circuit 4, the resistor 60, the line 14 and the diode 16. The other plate of the capacitor 40 closes the current circuit via the line 39, the diode 45, the voltage stabilizer 46 and its connection 47 with the low voltage source 5. When an ignition voltage is induced in the ignition circuits 32, 33 there is generated an alternating voltage which ignites the spark between the electrodes of the spark plugs 2, 3 with a first negative pulse. In this case, current flows from the electrode body of the spark plug to its central electrode and from there through the secondary winding 30 and 31 respectively, the line 36 and to one plate of the capacitor 40. The circuit is closed by current from the second plate of the capacitor 40 flowing through the line 39, incorporating the diode 45, to the voltage stabilizer 46 and hence to earth via the line 4.

The positive pulses of the ignition voltage generate, in a corresponding manner, current which flows in the opposite direction between the spark plug electrodes. The circuit is thereby completed via the Schottky-diode 27, earthed over the line 37, to the capacitor 40 and from there to respective spark plugs 2, 3 via the secondary winding 30 and 31 respectively.

According to the first alternative mentioned above, a positive measuring voltage of about 70 V is produced in the ignition circuits between the electrodes, this voltage being delivered from the voltage divider 60, 61 via the line 14. The measuring voltage will thus lie in the ignition circuits 2, 3 during the whole of the revolution of the crankshaft.

When combustion occurs, the measuring voltage generates an ionizing current between the spark plug electrodes. Since the measuring voltage is positive, there is obtained an ionizing current which flows from the central electrode of the spark plug to its body electrode. Thus, a current circuit is completed from the measuring capacitor 40 serving as the measuring voltage source, via the secondary winding and the spark plug electrodes concerned, the earthed voltage stabilizer 46, and across the resistor 41 back to the capacitor 40. A given part of the ionizing current is passed to the resistor 41, serving as a measuring resistance, also via the resistors 42, 43 connected in series to earth.

When ionizing current flows through the measuring resistor 41, a voltage drop occurs across the resistor. The potential which prevails in the line 52 when no ionizing current is present thereby drops, e.g., from a value of 5 V, which is sustained by the voltage stabilizer 46, to a value of −0.2 V. This latter value is determined by the Schottky-diode 27 with the aim of protecting the detector unit 50 from large negative voltages. This lowered potential is transferred as a true value to the detector unit 50, on the line 52. Comparison with the reference value on the line 51 will result in a change in the detector unit output signal on the output lines 54, 55 of the detector unit, provided that a comparison has actually taken place. The measuring window signal on the line 53 determines when the comparison is carried out. This signal is a square-wave signal which when high is said to present a window which permits the detector unit 50 to carry out said comparison.

The inventive solution is utilized to determine when combustion takes place in a given cylinder subsequent to an engine start. This information is then used as a starting point in the microcomputer system of the trigger unit 6 for calculating the correct order in which subsequent ignition pulses are sent to remaining cylinders. This is effected in a known manner, disclosed in our above-mentioned Swedish Patent Specification SE No. 442 345. Since detailed knowledge of the manner in which this correct order to achieved is not necessary in order to obtain an understanding of the present invention, it will not be described in detail here.

A measuring voltage which is higher than the voltage of 70 V mentioned above can be used, by selecting other resistance values for the resistors 60, 61 of the voltage divider. For example, the mesuring voltage may instead be 400 V. In addition to identifying normal combustion processes, a measuring voltage of such high value will also enable abnormal combustion processes to be identified reliably, such as preferably knocking and premature ignition. In this case a positive measuring voltage of 400 V occurs in the ignition circuits during the whole of the revolution of the crankshaft. The measuring process in other respects is effected in a known manner, such as that described in detail in the above-mentioned SE No. 442 345.

Similarly to that previously described, the higher measuring voltage of 400 V can also be used for indicating, at the same time, normal combustion processes for cylinder identification.

The invention can also be utilized, within the scope of the following claims, in ignition systems other than that described above. The illustrated and described exemplifying embodiment includes an ignition system for two cylinders. It will be understood, however, that the invention can also be applied with engines having four cylinders or with any desired number of cylinders. Similar to that which is described in detail in the above-mentioned Swedish Patent Specification No. 442 345, there can be used in the case of a four-cylinder engine two measuring devices each being used for two cylinders. In accordance with a further, alternative variant, one measuring device can be used for each cylinder.

Although the invention has been exemplified with reference to a capacitive ignition system, it will be understood that the invention can also be applied with an inductive ignition system.

In the case of the illustrative embodiment a constant measuring voltage is utilized during a start sequence and another measuring voltage is used after the start sequence. In the case of alternative embodiments it is conceivable to divide both the start sequence and that which occurs afterwards into further sequences or processes. For example, a first high measuring voltage can be applied immediately subsequent to the start sequence and a still higher voltage can be applied when the engine speed or engine temperature exceed values far above those values which correspond to the start sequence.

In the case of the illustrated embodiment several electronic units are shown as separate components. In practice, several components may advantageously comprise one and the same electronic component having the same functions as those recited in the description. Thus, several of the components may be included in a microprocessor or microcomputer. When reference is made in the claims to the sensing and the transmission of signals, this is assumed to include all manners of signal transmission in practice.

It will be obvious to one of normal skill in this art that the invention can be realized in other alternative forms.

I claim:

1. A method for detecting ionizing current in an ignition circuit forming part of an ignition system of an internal combustion engine, in which method a measuring voltage is applied to the ignition circuit in at least one secondary winding, and in which a measuring device is used to detect the possible presence of ionizing current in the ignition circuit, comprising the steps of:

detecting a parameter reprsenting an engine start sequence;

when an engine start sequence is detected applying one of a first substantially constant measuring voltage or no measuring voltage to the ignition; and when detection of the engine start sequence is terminated, applying a second, substantially constant measuring voltage to the ignition circuit;

said first measuring voltage being lower than the second measuring voltage.

2. A method according to claim 1, wherein the first measuring voltage is lower than a value at which ionizing current detection is possible, and the second measuring voltage has a value at which ionizing current detection is possible.

3. A method according to claim 1, wherein the first measuring voltage is substantially, equal to 0 volts, and the second measuring voltage exceeds 70 volts.

4. A method according to claim 1, wherein the engine start sequence is detected by means of a signal representing the engine speed, said start sequence existing when the engine speed lies beneath a given pre-determined value; and wherein the engine start sequence ends when the engine speed reaches this value.

5. A method according to claim 1, wherein the engine start sequence is detected with the aid of a signal representing the engine temperature, the start sequence existing when the engine temperature lies beneath a given pre-determined value; and wherein the start sequence ends when the engine temperature has reached said value.

6. A method according to claim 1, in which the measuring device is arranged in an earth connection for the secondary winding and in which the measuring and comprises a measuring capacitor; a voltage measuring point of the measuring device being connected to earth during the engine start sequence, the applied measuring voltage being substantially equal to 0 volts; the earth connection of the voltage measuring point being interrupted subsequent to the termination of the engine start sequence.

7. An arrangement for detecting ionizing current in at least one ignition circuit forming part of an ignition system of an internal combustion engine, said ignition circuit including at least one ignition-coil secondary winding and ignition devices for igniting fuel-air mixture present in a combustion chamber of the engine, said ignition circuit being connected to an external voltage source and, when combustion takes place in the combustion chamber, generating an ionizing current in the ignition circuit, this ionizing current being detected by a measuring device connected to the secondary winding, and wherein:

connected to a connection of the ignition circuit and the external voltage source is a connection to earth which includes a semiconductor switch, which receives control signals from a control unit;

the control unit is connected to transducers for sensing at least one engine parameter used for detecting an engine start; and the control unit is configured to send a signal to turn on the semiconductor switch for closing the earth connection during an engine start, so that the measuring device will apply a lower voltage than that applied in the absence of an engine start.

* * * * *